United States Patent
Nara et al.

(10) Patent No.: US 12,270,007 B2
(45) Date of Patent: *Apr. 8, 2025

(54) REFRIGERATOR OIL, AND WORKING FLUID COMPOSITION FOR REFRIGERATOR

(71) Applicant: ENEOS Corporation, Tokyo (JP)

(72) Inventors: Fumiyuki Nara, Tokyo (JP); Yohei Shono, Tokyo (JP); Hidetoshi Ogata, Tokyo (JP)

(73) Assignee: ENEOS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/266,945

(22) PCT Filed: Dec. 20, 2021

(86) PCT No.: PCT/JP2021/047049
§ 371 (c)(1),
(2) Date: Jun. 13, 2023

(87) PCT Pub. No.: WO2022/138569
PCT Pub. Date: Jun. 30, 2022

(65) Prior Publication Data
US 2023/0365887 A1    Nov. 16, 2023

(30) Foreign Application Priority Data
Dec. 24, 2020   (JP) ................. 2020-214695

(51) Int. Cl.
| | | |
|---|---|---|
| *C10M 171/00* | (2006.01) | |
| *C09K 5/04* | (2006.01) | |
| *C10M 101/02* | (2006.01) | |
| *C10M 171/02* | (2006.01) | |
| *C10N 20/02* | (2006.01) | |
| *C10N 40/30* | (2006.01) | |

(52) U.S. Cl.
CPC ......... *C10M 171/008* (2013.01); *C09K 5/042* (2013.01); *C10M 101/02* (2013.01); *C10M 171/02* (2013.01); *C09K 2205/12* (2013.01); *C10M 2203/1025* (2013.01); *C10N 2020/02* (2013.01); *C10N 2040/30* (2013.01)

(58) Field of Classification Search
CPC ............... C09K 5/042; C10N 2040/30; C10N 2020/04; C10N 2030/06; C10N 2030/02; C10N 2020/103; C10N 2020/02; C10M 129/56; C10M 101/00; C10M 171/008; C10M 2203/1025; C10M 2209/086; C10M 2205/028

See application file for complete search history.

(56) References Cited

U.S. PATENT DOCUMENTS

| | | | |
|---|---|---|---|
| 7,914,697 B2 | 3/2011 | Kaneko | |
| 2009/0062167 A1* | 3/2009 | Kaneko | ............... C09K 5/042 508/567 |
| 2010/0093568 A1* | 4/2010 | Tagawa | .............. C10M 171/008 508/459 |
| 2015/0045265 A1* | 2/2015 | Matsumoto | ............ C09K 5/045 508/261 |
| 2016/0355747 A1* | 12/2016 | Bredsguard | ........ C10M 169/044 |
| 2020/0354645 A1 | 11/2020 | Shono et al. | |
| 2020/0369979 A1* | 11/2020 | Nara | ................. C10M 137/105 |
| 2021/0032558 A1 | 2/2021 | Shono et al. | |

FOREIGN PATENT DOCUMENTS

| | | |
|---|---|---|
| CN | 101 033 433 A | 9/2007 |
| CN | 101400769 A | 4/2009 |
| CN | 101 892 077 B | 8/2013 |
| CN | 110249037 A | 9/2019 |
| CN | 111448295 A | 7/2020 |
| CN | 111670241 A | 9/2020 |
| JP | 2019-104777 A | 6/2019 |
| WO | 2006/062245 A1 | 6/2006 |
| WO | 2007/105452 A1 | 9/2007 |
| WO | 2018/143212 A1 | 8/2018 |
| WO | 2019/156126 A1 | 8/2019 |
| WO | 2021/100634 A1 | 5/2021 |

OTHER PUBLICATIONS

International Search Report issued in PCT/JP2021/047049, dated Mar. 8, 2022, along with an English translation thereof.
International Preliminary Report on Patentability issued in PCT/JP2021/047049, issued Jun. 13, 2023, along with an English translation thereof.
Office Action issued in EP Patent Application No. 21910713.3, Apr. 2, 2024.

* cited by examiner

Primary Examiner — Vishal V Vasisth
(74) Attorney, Agent, or Firm — GREENBLUM & BERNSTEIN, P.L.C.

(57) ABSTRACT

A refrigerating machine oil having a flash point of 130° C. or lower and a carbon residue of 10% residual oil of 0.02% by mass or more.

10 Claims, No Drawings

REFRIGERATOR OIL, AND WORKING FLUID COMPOSITION FOR REFRIGERATOR

This application is a 371 of PCT/JP2021/047049, filed Dec. 20, 2021.

TECHNICAL FIELD

The present invention relates to a refrigerating machine oil and a working fluid composition for a refrigerating machine oil.

BACKGROUND ART

In refrigerating machines, it is increasingly desirable to replace refrigerants having relatively high global warming potential (GWP) with low GWP refrigerants, for example less than 150. Examples of the low GWP refrigerants include carbon dioxide (R744) refrigerant and hydrocarbon refrigerants.

On the other hand, the refrigerating machine is also required to save energy. In general, as viscosity of the refrigerating machine oil is lower, the stirring resistance and the friction of the sliding portion can be reduced. Therefore, the lowering of viscosity of the refrigerating machine oil leads to energy saving of the refrigerating machine. For example, Patent Document 1 discloses a refrigerating machine oil of VG3 or more and VG8 or less.

CITATION LIST

Patent Literature

Patent Document 1: International Publication No. 2006/062245

SUMMARY OF INVENTION

Technical Problem

As one of means for lowering viscosity of the refrigerating machine oil, it is conceivable to increase content of light components in the refrigerating machine oil. The refrigerating machine oil containing large content of light components can also be said as a refrigerating machine oil having a low flash point. However, when flash point of the refrigerating machine oil lowers (content of light components increases), it becomes difficult to hold the oil film in the sliding portion, and thus there is a concern that, for example, antiwear property may deteriorate.

Accordingly, an aspect of the present invention is to provide a refrigerating machine oil having low flash point and excellent antiwear property.

Solution to Problem

According to studies by the present inventors, it has been found that even when the flash point of the refrigerating machine oil is low (for example, 130° C. or lower), excellent antiwear property can be obtained as long as the carbon residue of 10% residual oil of the refrigerating machine oil is within the specific range.

One aspect of the present invention is a refrigerating machine oil having a flash point of 130° C. or lower and a carbon residue of 10% residual oil of 0.02% by mass or more.

The refrigerating machine oil may contain: a low-viscosity hydrocarbon oil having a kinematic viscosity at 40° C. of 6 mm$^2$/s or lower; and a high-viscosity hydrocarbon oil having a kinematic viscosity at 40° C. of 200 mm$^2$/s or higher. A content of the low-viscosity hydrocarbon oil may be 85% by mass or more based on the total amount of the refrigerating machine oil. A content of the high-viscosity hydrocarbon oil may be 10% by mass or less based on the total amount of the refrigerating machine oil. The refrigerating machine oil may have a 90% distillation temperature of 270° C. or lower.

Another aspect of the present invention is a working fluid composition for a refrigerating machine oil containing: the above refrigerating machine oil; and a refrigerant. The refrigerant may contain a hydrocarbon.

Advantageous Effects of Invention

According to an aspect of the present invention, a refrigerating machine oil having low flash point and excellent antiwear property may be provided.

DESCRIPTION OF EMBODIMENTS

Hereinafter, embodiments of the present invention will be described in detail. One embodiment of the present invention is a refrigerating machine oil having a flash point of 130° C. or lower and a carbon residue of 10% residual oil of 0.02% by mass or more.

The flash point of the refrigerating machine oil may be, for example, 70° C. or higher, 80° C. or higher, 90° C. or higher, 100° C. or higher, or 110° C. or higher, and may be 125° C. or lower or 120° C. or lower, from the viewpoint of further reducing the viscosity of the refrigerating machine oil. The flash point in the present specification means flash point measured in accordance with the Cleveland open cup (COC) method described in JIS K2265-4:2007.

The carbon residue of 10% residual oil of the refrigerating machine oil may be preferably 0.05% by mass or more, 0.08% by mass or more, or 0.1% by mass or more, and may be, for example, 0.6% by mass or less, 0.5% by mass or less, or 0.4% by mass or less, from the viewpoint of further improving antiwear property. The carbon residue in the present specification means carbon residue measured by the Micro method in accordance with JIS K2270-2:2009. The carbon residue of 10% residual oil in the present specification means carbon residue measured by the same method for residual oil obtained by distilling a refrigerating machine oil and removing distillate oil having a volume fraction of up to 90%.

The kinematic viscosity at 40° C. of the refrigerating machine oil may be, for example, 1 mm$^2$/s or higher, 1.5 mm$^2$/s or higher, or 2 mm$^2$/s or higher, and 6 mm$^2$/s or lower, 5 mm$^2$/s or lower, 4.5 mm$^2$/s or lower, 4 mm$^2$/s or lower, 3.5 mm$^2$/s or lower, or 3 mm$^2$/s or lower. The kinematic viscosity in the present specification means kinematic viscosity measured in accordance with JIS K2283:2000.

The kinematic viscosity at 100° C. of the refrigerating machine oil, for example, may be 0.5 mm$^2$/s or higher, 0.7 mm$^2$/s or higher, or 1 mm$^2$/s or higher, and may be 2 mm$^2$/s or lower, 1.5 mm$^2$/s or lower, 1.4 mm$^2$/s or lower, 1.3 mm$^2$/s or lower, 1.2 mm$^2$/s or lower, or 1.1 mm$^2$/s or lower.

The density of the refrigerating machine oil may be, for example, 0.78 g/cm$^3$ or more, 0.79 g/cm$^3$ or more, or 0.80 g/cm$^3$ or more, and may be 0.85 g/cm$^3$ or less, 0.84 g/cm$^3$ or less, or 0.83 g/cm$^3$ or less. The density in the present specification means density at 15° C. measured in accordance with "Oscillating U-tube method" described in JIS K2249-1:2011.

The pour point of the refrigerating machine oil, for example, may be −10° C. or lower, −20° C. or lower, −30° C. or lower, or −40° C. or lower, and may be −60° C. or higher. The pour point in the present specification means pour point measured in accordance with JIS K2269:1987.

The content of hydrocarbon having 12 to 16 carbon atoms in the refrigerating machine oil or in the hydrocarbon oil contained in the refrigerating machine oil (amount of C12-16 components) may be preferably 80% by mass or more, 85% by mass or more, or 90% by mass or more, and 97% by mass or less, 96% by mass or less, or 95% by mass or less, based on the total amount of the hydrocarbon oil, from the viewpoint of further improving antiwear property.

The content of hydrocarbons having 13 to 18 carbon atoms in the refrigerating machine oil or in the hydrocarbon oil contained in the refrigerating machine oil (amount of C13-18 components) may be preferably 80% by mass or more, 85% by mass or more, or 90% by mass or more, and may be 99% by mass or less, 98% by mass or less, or 97% by mass or less, based on the total amount of the hydrocarbon oil, from the viewpoint of further improving antiwear property.

The content of n-paraffin in the refrigerating machine oil or the hydrocarbon oil contained in the refrigerating machine oil, based on the total amount of the hydrocarbon oil, may be preferably 0.5% by mass or more, 2% by mass or more, 5% by mass or more, 8% by mass or more, or 9% by mass or more, and may be 50% by mass or less, 30% by mass or less, or 25% by mass or less, from the viewpoint of further improving antiwear property, and may be 40% by mass or less, 30% by mass or less, 20% by mass or less, or 15% by mass or less, from the viewpoint of low-temperature fluidity. In addition, the content of the n-paraffin may be 5% by mass or more, 10% by mass or more, 15% by mass or more, or 20% by mass or more, from the viewpoint of further reducing friction coefficient.

The content of paraffin in the refrigerating machine oil or in the hydrocarbon oil contained in the refrigerating machine oil may be preferably 30% by mass or more, 40% by mass or more, 50% by mass or more, 55% by mass or more, or 60% by mass or more, and may be 100% by mass or less, 90% by mass or less, or 80% by mass or less, based on the total amount of the hydrocarbon oil, from the viewpoint of further reducing friction coefficient.

The content of 1-ring to 6-ring cycloparaffin (hereinafter simply referred to as "cycloparaffin") in the refrigerating machine oil or in the hydrocarbon oil contained in the refrigerating machine oil may be preferably 70% by mass or less, 60% by mass or less, 50% by mass or less, 45% by mass or less, or 40% by mass or less, and may be 0% by mass or more, 10% by mass or more, 20% by mass or more, 30% by mass or more, or 35% by mass or more, based on the total amount of the hydrocarbon oil, from the viewpoint of further reducing friction coefficient.

The ratio of the paraffin to the cycloparaffin (paraffin/cycloparaffin) may be preferably 0.3 or more, 0.6 or more, 1.0 or more, 1.2 or more, 1.4 or more, 1.5 or more, or 1.8 or more, and may be preferably 100 or less, 50 or less, 10 or less, 5 or less, or 4 or less, from the viewpoint of further reducing friction coefficient.

The aromatic content in the refrigerating machine oil or in the hydrocarbon oil contained in the refrigerating machine oil may be preferably 10% by mass or less, 5% by mass or less, 3% by mass or less, or 1% by mass or less, from the viewpoint of further improving antiwear property.

In the present specification, the contents of hydrocarbons having 12 to 16 carbon atoms, hydrocarbons having 13 to 18 carbon atoms, n-paraffins, paraffins, cycloparaffins, and aromatic hydrocarbon oils in the refrigerating machine oil or in the hydrocarbon oil contained in the refrigerating machine oil are determined by fractionating a sample to be analyzed into a saturated hydrocarbon oil and an aromatic hydrocarbon oil by silica gel chromatography, and subjecting each to hydrocarbon type analysis by GC-TOFMS combined with gas chromatography and mass spectrometry by FI ionization. Examples of analysis conditions are shown below. The contents of the saturated hydrocarbon oil and the aromatic hydrocarbon oil may be determined by fractionation using the silica gel chromatography.

(Gas Chromatography Conditions)
    Column: ZB-1MS manufactured by phenomenex
    Injection temperature: 350° C.
    Temperature rise condition: 50° C. to 350° C. (temperature rise rate: 5° C./min)
    Carrier gas: helium
    Injection method: split sample injection amount: 1 μL (10% toluene solution)

(Ms Conditions)
    Counter electrode voltage: −10 kV
    Ionization method: FI (field ionization)
    Ion source temperature: room temperature
    Mass number measurement range: m/z 35 to 500

In the mass spectra obtained as a result of GC-TOFMS analysis, the percentage of ion intensity for each type of carbon atoms ($C_nH_{2n+z}$, wherein n is an integer and z is an even number of −18 to 2) can be determined from the percentage of total ion intensity. When the aromatic hydrocarbon content of the sample fractionated by the silica gel chromatography is less than 1% by mass, the chromatographic fractionation may be omitted and the hydrocarbon type analysis by the GC-TOFMS method may be performed. In this case, the content of each component is calculated assuming that all components are saturated hydrocarbon components.

The refrigerating machine oil may have distillation characteristics as described below. In the following description, the distillation characteristics of the refrigerating machine oil and the hydrocarbon oil contained therein are all measured according to the atmospheric pressure method described in JIS K2254:2018.

The initial boiling point (IBP) of the refrigerating machine oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower, from the viewpoint of further improving antiwear property.

The 10% distillation temperature (T10) of the refrigerating machine oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further improving antiwear property.

The 50% distillation temperature (T50) of the refrigerating machine oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further improving antiwear property.

The 90% distillation temperature (T90) of the refrigerating machine oil may be preferably 267° C. or lower, 266° C. or lower, 265° C. or lower, 264° C. or lower, 263° C. or lower, 262° C. or lower, or 261° C. or lower, from the viewpoint of further improving antiwear property, and may be, for example, 220° C. or higher, 230° C. or higher, 240° C. or higher, 245° C. or higher, or 250° C. or higher.

The distillation end point (EP) of the refrigerating machine oil may be preferably 250° C. or higher, 260° C. or higher, 270° C. or higher, 275° C. or higher, or 280° C. or higher, and may be 320° C. or lower, 310° C. or lower, 300° C. or lower, 295° C. or lower, or 290° C. or lower, from the viewpoint of further improving antiwear property.

The difference between the T10 and the T90 (T90−T10) of the refrigerating machine oil may be preferably 5° C. or higher, 6° C. or higher, 7° C. or higher, 8° C. or higher, 9° C. or higher, or 10° C. or higher, and may be 40° C. or lower, 30° C. or lower, 20° C. or lower, or 15° C. or lower, from the viewpoint of further improving antiwear property.

The total distillation amount of the refrigerating machine oil may be, for example, 90% by volume or more, 93% by volume or more, or 95% by volume or more, and may be 99% by volume or less. The residual oil amount of the refrigerating machine oil may be, for example, 1% by volume or more, and may be 10% by volume or less, 7% by volume or less, or 5% by volume or less. The loss amount of the refrigerating machine oil may be, for example, 1% by volume or less, 0.5% by volume or less, or 0.1% by volume or less, and may be 0% by volume.

The refrigerating machine oil as described above contains, for example, a hydrocarbon oil. Examples of the hydrocarbon oil include mineral oil-based hydrocarbon oils, synthetic hydrocarbon oils, and mixed oils thereof. Examples of the mineral oil-based hydrocarbon oil include paraffinic or naphthenic refined mineral oils obtained by refining crude oil or distillation residual oil thereof as a raw material by appropriately combining ordinary petroleum refining treatments (solvent deasphalting, solvent extraction, hydrocracking, solvent dewaxing, catalytic dewaxing, hydrorefining, sulfuric acid washing, clay treatment, distillation, and the like). Examples of the synthetic hydrocarbon oil include poly-α-olefins or hydrogenated products thereof, isoparaffins, alkylbenzenes, and alkylnaphthalenes. These hydrocarbon oils may be used alone or in combination of two or more thereof.

From the viewpoint of further improving antiwear property, the refrigerating machine oil preferably contains, as hydrocarbon oils, a low-viscosity hydrocarbon oil having a kinematic viscosity at 40° C. of 6 mm$^2$/s or lower and a high-viscosity hydrocarbon oil having a kinematic viscosity at 40° C. of 200 mm$^2$/s or higher.

The kinematic viscosity at 40° C. of the low-viscosity hydrocarbon oil may be, for example, 1 mm$^2$/s or higher, 1.5 mm$^2$/s or higher, or 2.0 mm$^2$/s or higher, and may be 5 mm$^2$/s or lower, 4.5 mm$^2$/s or lower, 4 mm$^2$/s or lower, 3.5 mm$^2$/s or lower, or 3.0 mm$^2$/s or lower.

The kinematic viscosity at 100° C. of the low-viscosity hydrocarbon oil may be, for example, 0.5 mm$^2$/s or higher, 0.7 mm$^2$/s or higher, or 1 mm$^2$/s or higher, and may be 2 mm$^2$/s or lower, 1.5 mm$^2$/s or lower, 1.4 mm$^2$/s or lower, 1.3 mm$^2$/s or lower, 1.2 mm$^2$/s or lower, or 1.1 mm$^2$/s or lower.

The density of the low-viscosity hydrocarbon oil, for example, may be 0.78 g/cm$^3$ or more, 0.79 g/cm$^3$ or more, 0.80 g/cm$^3$ or more, 0.81 g/cm$^3$ or more, or 0.82 g/cm$^3$ or more, and may be 0.84 g/cm$^3$ or less, 0.83 g/cm$^3$ or less, 0.82 g/cm$^3$ or less, or 0.81 g/cm$^3$ or less.

The flash point of the low-viscosity hydrocarbon oil, for example, may be 30° C. or higher, 60° C. or higher, 90° C. or higher, 100° C. or higher, or 110° C. or higher, and may be, from the viewpoint of further reducing viscosity of the refrigerating machine oil, 130° C. or lower, 125° C. or lower, or 120° C. or lower.

The pour point of the low-viscosity hydrocarbon oil, for example, may be −10° C. or lower, −20° C. or lower, −30° C. or lower, or −40° C. or lower, and may be −60° C. or higher.

The 90% distillation temperature (T90) of the low-viscosity hydrocarbon oil may be preferably 270° C. or lower, 267° C. or lower, 266° C. or lower, 265° C. or lower, 264° C. or lower, 263° C. or lower, 262° C. or lower, or 261° C. or lower, from the viewpoint of further improving antiwear properties, and may be, for example, 220° C. or higher, 230° C. or higher, 240° C. or higher, 245° C. or higher, or 250° C. or higher.

From the viewpoint of further improving antiwear property, the initial boiling point (IBP) of the low-viscosity hydrocarbon oil may be preferably 140° C. or higher, 170° C. or higher, 190° C. or higher, 200° C. or higher, 210° C. or higher, 220° C. or higher, 230° C. or higher, or 240° C. or higher, and may be 260° C. or lower, 255° C. or lower, or 250° C. or lower.

The 10% distillation temperature (T10) of the low-viscosity hydrocarbon oil may be preferably 200° C. or higher, 210° C. or higher, 220° C. or higher, 230° C. or higher, or 240° C. or higher, and may be 260° C. or lower, 255° C. or lower, or 250° C. or lower, from the viewpoint of further improving antiwear property.

The 50% distillation temperature (T50) of the low-viscosity hydrocarbon oil may be preferably 210° C. or higher, 220° C. or higher, 230° C. or higher, 240° C. or higher, or 245° C. or higher, and may be 265° C. or lower, 260° C. or lower, 255° C. or lower, or 250° C. or lower, from the viewpoint of further improving antiwear property.

The distillation end point (EP) of the low-viscosity hydrocarbon oil may be preferably 250° C. or higher, 260° C. or higher, 270° C. or higher, 275° C. or higher, or 280° C. or higher, and may be 320° C. or lower, 310° C. or lower, 300° C. or lower, 295° C. or lower, or 290° C. or lower, from the viewpoint of further improving antiwear property.

The difference between the T90 and the T10 (T90−T10) of the low-viscosity hydrocarbon oil may be preferably 5° C. or higher, 6° C. or higher, 7° C. or higher, 8° C. or higher, 9° C. or higher, or 10° C. or higher, and may be 40° C. or lower, 30° C. or lower, 20° C. or lower, or 15° C. or lower, from the viewpoint of further improving antiwear property.

The total distillation amount of the low-viscosity hydrocarbon oil may be, for example, 95% by volume or more, 96% by volume or more, 97% by volume or more, 98% by volume or more, or 99% by volume or more, and may be 99.9% by volume or less. The residual oil amount of the low-viscosity hydrocarbon oil may be, for example, 0.1% by volume or more, and may be 6% by volume or less, 4% by volume or less, 3% by volume or less, 2% by volume or less, or 1% by volume or less. The loss amount of the low-viscosity hydrocarbon oil may be, for example, 1% by volume or less, 0.5% by volume or less, or 0.10% by volume or less, and may be 0% by volume.

The low-viscosity hydrocarbon oil is obtained, for example, by hydrorefining a light and gas oil fraction obtained by atmospheric distillation of crude oil, or a cracked gas oil fraction obtained by cracking a residual oil feedstock containing atmospheric residual oil of crude oil or its vacuum residual oil, and fractionating so that hydrocarbons having the distillation properties described above, particularly 12 to 16 carbon atoms or 13 to 18 carbon atoms, become the main component (for example, 50% by mass or more, particularly 80% by mass or more).

The content of the low-viscosity hydrocarbon oil, based on the total amount of the hydrocarbon oil contained in the refrigerating machine oil, is preferably 70% by mass or more, 80% by mass or more, 90% by mass or more, or 95% by mass or more, from the viewpoint of further reducing the viscosity of the refrigerating machine oil, and may be, for example, 99.5% by mass or less. The content of the low-viscosity hydrocarbon oil, based on the total amount of the refrigerating machine oil, is preferably 70% by mass or more, 80% by mass or more, 90% by mass or more, or 95% by mass or more, from the viewpoint of further reducing the viscosity of the refrigerating machine oil, and may be, for example, 99.5% by mass or less.

The kinematic viscosity at 40° C. of the high-viscosity hydrocarbon oil may be preferably 300 mm$^2$/s or higher, 350 mm$^2$/s or higher, 400 mm$^2$/s or higher, or 450 mm$^2$/s or higher, from the viewpoint of further improving antiwear property, and may be, for example, 1000 mm$^2$/s or lower, 800 mm$^2$/s or lower, 600 mm$^2$/s or lower, or 500 mm$^2$/s or lower.

The kinematic viscosity at 100° C. of the high-viscosity hydrocarbon oil, for example, may be 10 mm$^2$/s or higher, 20 mm$^2$/s or higher, or 30 mm$^2$/s or higher, and may be 100 mm$^2$/s or lower, 50 mm$^2$/s or lower, or 40 mm$^2$/s or lower.

The viscosity index of the high-viscosity hydrocarbon oil, for example, may be 0 or higher, 50 or higher, or 80 or higher, and may be 300 or lower, 140 or lower, or 100 or lower. The viscosity index in the present specification means viscosity index measured in accordance with JIS K2283: 2000.

The flash point of the high-viscosity hydrocarbon oil, for example, may be 200° C. or higher, 250° C. or higher, or 300° C. or higher, and may be 500° C. or lower, 450° C. or lower, or 400° C. or lower.

As the high-viscosity hydrocarbon oil, those having the above-mentioned characteristics are preferable, and are not particularly limited. For example, a residual-oil-based hydrocarbon substrate in a crude oil refining process can be used. Examples of the residual oil hydrocarbon base material include atmospheric distillation residual oil of crude oil, vacuum distillation residual oil of the atmospheric distillation residual oil, deasphalted oil of these residual oils by propane or the like, solvent extracted extract oil of the deasphalted oil by furfural or the like, solvent extracted raffinate oil of the deasphalted oil, and refined oil obtained by subjecting these oils to refining treatment such as hydrocracking, hydrorefining, solvent dewaxing, or hydrodewaxing. Among them, particularly preferred is a refined oil obtained by hydrorefining a solvent-extracted raffinate of a deasphalted oil of a vacuum distillation residual oil, followed by solvent dewaxing or hydrodewaxing.

The carbon residue of the high-viscosity hydrocarbon oil is not particularly limited, but may be preferably 0.1% by mass or more, 0.2% by mass or more, or 0.3% by mass or more, and may be preferably 10% by mass or less, 5% by mass or less, 1% by mass or less, or 0.8% by mass or less, from the viewpoint of further improving antiwear property.

The ASTM color of the high-viscosity hydrocarbon oil may be 6.0 or less, 4.0 or less, or 3.0 or less, may be L0.5, or may be 0.5 or more, or 1.0 or more, from the viewpoint of hue of the refrigerating machine oil.

The content of the high-viscosity hydrocarbon oil may be preferably 0.5% by mass or more, 1% by mass or more, 2% by mass or more, or 3% by mass or more, from the viewpoint of further improving antiwear property, and may be, for example, 10% by mass or less, 9% by mass or less, 8% by mass or less, 7% by mass or less, 6% by mass or less, or 5% by mass or less, based on the total amount of the hydrocarbon oil contained in the refrigerating machine oil. The content of the high-viscosity hydrocarbon oil may be preferably 0.5% by mass or more, 1% by mass or more, 2% by mass or more, or 3% by mass or more, from the viewpoint of further improving antiwear property, and may be, for example, 10% by mass or less, 9% by mass or less, 8% by mass or less, 7% by mass or less, 6% by mass or less, or 5% by mass or less, based on the total amount of the refrigerating machine oil.

The refrigerating machine oil may further contain a hydrocarbon oil other than the above-described low-viscosity hydrocarbon oil and high-viscosity hydrocarbon oil, and may further contain an oxygen-containing oil. The refrigerating machine oil may further contain an additive. Examples of the additive include an antiwear agent, an antioxidant, an acid scavenger, an extreme pressure agent, a metal deactivator, a pour point depressant, and a detergent dispersant. The content of these additives may be 10% by mass or less or 5% by mass or less, based on the total amount of the refrigerating machine oil.

From the viewpoint of improving antiwear property, the refrigerating machine oil preferably contains an antiwear agent as an additive. Examples of the antiwear agent include a phosphorus-containing antiwear agent. Examples of the phosphorus-containing antiwear agent include phosphoric acid esters, thiophosphoric acid esters, acidic phosphoric acid esters, amine salts of acidic phosphoric acid esters, and chlorinated phosphoric acid esters. The antiwear agent (preferably phosphorus-containing antiwear agent) may be used alone or in combination of two or more. The phosphorus-containing antiwear agent is preferably one or two or more selected from phosphoric acid esters and thiophosphoric acid esters.

Examples of the phosphoric acid ester include tributyl phosphate, tripentyl phosphate, trihexyl phosphate, triheptyl phosphate, trioctyl phosphate, trinonyl phosphate, tridecyl phosphate, triundecyl phosphate, tridodecyl phosphate, tritridecyl phosphate, tritetradecyl phosphate, tripentadecyl phosphate, trihexadecyl phosphate, triheptadecyl phosphate, trioctadecyl phosphate, trioleyl phosphate, triphenyl phosphate, tricresyl phosphate, tri(ethylphenyl) phosphate, tri(butylphenyl) phosphate, trixylenyl phosphate, cresyl diphenyl phosphate, and xylenyl diphenyl phosphate. The phosphoric acid ester is preferably triphenyl phosphate or tricresyl phosphate.

Examples of the thiophosphoric acid ester include tributyl phosphorothionate, tripentyl phosphorothionate, trihexyl phosphorothionate, triheptyl phosphorothionate, trioctyl phosphorothionate, trinonyl phosphorothionate, tridecyl phosphorothionate, triundecyl phosphorothionate, tridodecyl phosphorothionate, tritridecyl phosphorothionate, tritetradecyl phosphorothionate, tripentadecyl phosphorothionate, trihexadecyl phosphorothionate, triheptadecyl phosphorothionate, trioctadecyl phosphorothionate, trioleyl phosphorothionate, triphenyl phosphorothionate, tricresyl phosphorothionate, trixylenyl phosphorothionate, cresyl diphenyl phosphorothionate and xylenyl diphenyl phosphorothionate. The thiophosphate ester is preferably triphenylphosphorothionate.

The content of the antiwear agent (preferably phosphorus-containing antiwear agent) may be, for example, 0.1% by mass or more, 0.5% by mass or more, or 1% by mass or more, and may be 5% by mass or more and 4% by mass or less, or 30% by mass or less, based on the total amount of the refrigerating machine oil.

The refrigerating machine oil according to the present embodiment may be mixed with a refrigerant and present in a state of working fluid composition for a refrigerating machine, in a refrigerating machine. That is, one embodiment of the present invention is a working fluid composition for a refrigerating machine containing the above refrigerating machine oil and a refrigerant. The content of the refrigerating machine oil in the working fluid composition for a refrigerating machine may be 1 part by mass or more or 2 parts by mass or more, and may be 500 parts by mass or less or 400 parts by mass or less, with respect to 100 parts by mass of the refrigerant.

The refrigerant preferably contains a hydrocarbon. The content of the hydrocarbon may be 50% by mass or more, 60% by mass or more, 70% by mass or more, 80% by mass or more, 90% by mass or more, or 95% by mass or more, based on the total amount of the refrigerant.

The hydrocarbon is preferably a hydrocarbon having 1 to 5 carbon atoms, and more preferably a hydrocarbon having 2 to 4 carbon atoms. Specific examples of the hydrocarbon include methane, ethylene, ethane, propylene, propane (R290), cyclopropane, n-butane, isobutane (R600a), cyclobutane, methylcyclopropane, 2-methylbutane, n-pentane, and a mixture of two or more thereof. The hydrocarbon is preferably a hydrocarbon which is gaseous at 25° C. and 1 atm, more preferably propane, normal butane, isobutane, 2-methylbutane or a mixture thereof.

The refrigerant may contain one or two or more selected from saturated hydrofluorocarbons, unsaturated hydrofluorocarbons, fluorine-containing ethers such as perfluoroethers, bis(trifluoromethyl)sulfide, trifluoroiodomethane, and natural refrigerants such as ammonia and carbon dioxide, in addition to or instead of the hydrocarbon.

EXAMPLES

Hereinafter, the present invention will be described in more detail based on examples, but the present invention is not limited to the following examples.

Low-viscosity hydrocarbon oils 1 to 3 used in Examples and Comparative Examples are as follows. Since the aromatic content of these hydrocarbon oils was less than 1% by mass, chromatographic fractionation was not carried out, and hydrocarbon type analysis by the GC-TOFMS method described above was directly carried out by regarding all as saturated hydrocarbons. The characteristics of these low viscosity hydrocarbon oils are shown in Table 1.

Low-viscosity hydrocarbon oil 1: mineral oil-based hydrocarbon oil obtained by hydrorefining and fractionating a raw material hydrocracking gas oil containing a vacuum distillation residual oil (aromatic content<1% by mass, ASTM color: 0)

Low-viscosity hydrocarbon oil 2: mineral oil-based hydrocarbon oil obtained by hydrodesulfurizing and fractionating an atmospheric distillation distillate of crude oil (aromatic content<1% by mass, ASTM color: 0)

Low-viscosity hydrocarbon oil 3: mineral oil-based hydrocarbon oil obtained by hydrodesulfurizing and fractionating an atmospheric distillation distillate of crude oil (aromatic content<1% by mass, ASTM color: 0)

TABLE 1

| | | | Low-viscosity hydrocarbon oil | | |
|---|---|---|---|---|---|
| | | | 1 | 2 | 3 |
| Kinematic viscosity | 40° C. | mm$^2$/s | 2.44 | 2.32 | 2.357 |
| | 100° C. | | 1.1 | 1.0 | 1.029 |
| Density | | g/cm$^3$ | 0.827 | 0.806 | 0.8013 |
| Flash point | | ° C. | 116 | 118 | 118 |
| Pour point | | ° C. | <−45 | <−45 | −25 |
| Distillation characteristics | IBP | ° C. | 242 | 242 | 244.5 |
| | T10 | | 246 | 247.5 | 247.5 |
| | T50 | | 249 | 250 | 250 |
| | T90 | | 253 | 261 | 257.5 |
| | EP | | 282 | 292 | 278 |
| | T90-T10 | | 7.0 | 13.5 | 10 |
| | Total distillation amount | % by volume | 99 | 99 | 98 |
| | Residual oil amount | | 1 | 1 | 1 |
| | Loss amount | | 0 | 0 | 1 |
| Amount of C12-16 components | | % by mass | 97.1 | 93.9 | 94.2 |
| Amount of C13-C18 components | | % by mass | 99.5 | 99.4 | 99.3 |
| Amount of n-paraffin | | % by mass | 1.2 | 9.6 | 23.6 |
| Amount of paraffin | | % by mass | 45 | 68 | 59 |
| Amount of cycloparaffin | | % by mass | 55 | 32 | 41 |
| Paraffin/cycloparaffin | | — | 0.8 | 2.1 | 1.44 |

High-viscosity hydrocarbon oils 1 and 2 having the following characteristics were obtained by hydrorefining the solvent extracted raffinate of the deasphalted oil of vacuum distillation residual oil and solvent dewaxing.

High-viscosity hydrocarbon oil 1 (40° C. kinematic viscosity: 479.4 mm$^2$/s, 100° C. kinematic viscosity: 31.72 mm$^2$/s, viscosity index 97, flash point: >300° C., carbon residue: 0.51% by mass, ASTM color: L2.0)

High-viscosity hydrocarbon oil 2 (40° C. kinematic viscosity: 458 mm$^2$/s, 100° C. kinematic viscosity: 31.2 mm$^2$/s, viscosity index 98, flash point: >300° C., carbon residue: 0.5% by mass, ASTM color: L2.0)

These hydrocarbon oils were used in the compositions (% by mass based on the total amount of hydrocarbon oil) shown in Table 2. Refrigerating machine oils were prepared by mixing 98.3% by mass of each base oil and 1.7% by mass of a phosphorus-containing antiwear agent composed of a mixture of tricresyl phosphate and triphenyl phosphorothionate (all based on the total amount of the refrigerating machine oil). The hydrocarbon type analysis was performed on the hydrocarbon oil contained in each refrigerating machine oil, and the results are shown in Table 2. The characteristics of the each refrigerating machine oil are also shown in Table 2.

[Evaluation of Antiwear Property]

For antiwear property, seizure load was measured in accordance with ASTM D3233-73 using a Falex (pin/V block) tester under conditions of temperature 60° C. and rotational speed 290 rpm. The larger the seizure load, the better antiwear property. The results are shown in Table 2.

|  |  |  | Example | | | | | | Comparative Example | |
| --- | --- | --- | --- | --- | --- | --- | --- | --- | --- | --- |
|  |  |  | 1 | 2 | 3 | 4 | 5 | 6 | 1 | 2 |
| Composition of hydrocarbon oil (% by mass) | Low-viscosity | 1 | 98 | 96 | 98 | 96 | — | — | 100 | — |
|  |  | 2 | — | — | — | — | 98 | 95 | — | 100 |
|  | High-viscosity | 1 | 2 | 4 | — | — | 2 | 5 | — | — |
|  |  | 2 | — | — | 2 | 4 | — | — | — | — |
| Flash point |  | °C. | 116 | 116 | 116 | 116 | 118 | 118 | 116 | 118 |
| Amount of C12-16 components |  | % by mass | 95.2 | 93.2 | 95.2 | 93.2 | 92.0 | 89.2 | 97.1 | 93.9 |
| Amount of C13-C18 components |  | % by mass | 97.4 | 95.5 | 97.4 | 95.5 | 97.4 | 94.4 | 99.5 | 99.4 |
| Amount of n-paraffin |  | % by mass | 1.2 | 1.2 | 1.2 | 1.2 | 9.4 | 9.1 | 1.2 | 9.6 |
| Amount of paraffin |  | % by mass | 44 | 44 | 44 | 44 | 67 | 66 | 45 | 68 |
| Amount of cycloparaffin |  | % by mass | 56 | 56 | 56 | 56 | 33 | 34 | 55 | 32 |
| Paraffin/cycloparaffin |  | — | 0.8 | 0.8 | 0.8 | 0.8 | 2.0 | 1.9 | 0.8 | 2.1 |
| Carbon residue of 10% residual oil |  | % by mass | 0.1 | 0.21 | 0.1 | 0.2 | 0.1 | 0.25 | <0.01 | <0.01 |
| Kinematic viscosity | 40° C. | mm²/s | 2.61 | 2.79 | 2.61 | 2.79 | 2.52 | 2.80 | 2.44 | 2.32 |
|  | 100° C. |  | 1.1 | 1.2 | 1.1 | 1.2 | 1.1 | 1.2 | 1.1 | 1.0 |
| Density |  | g/cm³ | 0.827 | 0.829 | 0.828 | 0.829 | 0.808 | 0.811 | 0.827 | 0.806 |
| Pour point |  | °C. | <−45 | <−45 | <−45 | <−45 | <−45 | <−45 | <−45 | <−45 |
| Distillation characteristics | IBP | °C. | 242.5 | 241 | 242 | 241 | 242 | 242 | 242 | 242 |
|  | T10 |  | 246 | 246 | 246 | 246 | 247.5 | 247.5 | 246 | 247.5 |
|  | T50 |  | 249.5 | 249.5 | 249.5 | 249.5 | 250 | 250 | 249 | 250 |
|  | T90 |  | 256.5 | 258 | 256 | 258.5 | 262 | 265 | 253 | 261 |
|  | EP |  | 284 | 285 | 285 | 284 | 294 | 295 | 282 | 292 |
|  | T90-T10 |  | 10.5 | 12.0 | 10.0 | 12.5 | 14.5 | 17.5 | 7.0 | 13.5 |
|  | Total distillation amount | % by volume | 97 | 96 | 97 | 95.5 | 97 | 95 | 97.5 | 97 |
|  | Residual oil amount |  | 3 | 4 | 3 | 4.5 | 3 | 5 | 2 | 3 |
|  | Loss amount |  | 0 | 0 | 0 | 0 | 0 | 0 | 0.5 | 0 |
| Antiwear property | Seizure load | lbf | 590 | 660 | 600 | 680 | 740 | 780 | 450 | 510 |

Furthermore, in each of Examples 5 and 6, the low-viscosity hydrocarbon oil 3 was used instead of the low-viscosity hydrocarbon oil 2 to prepare each of the refrigerating machine oils of Examples 7 and 8. In the obtained refrigerating machine oils of Examples 7 and 8, the amount of n-paraffin was larger and the pour point was slightly higher than those of each refrigerating machine oil of Examples 5 and 6, but equal or better antiwear property and further improved low friction property.

(Low Temperature Precipitation Test in Presence of Refrigerant)

The refrigerating machine oils of Examples 1 to 8 were subjected to a low-temperature precipitation test according to Appendix A of JIS K2211 (2009), using R600a that is a hydrocarbon refrigerant, as the refrigerant. In the mixed fluid of the refrigerating machine oils of Examples 1 to 8 and R600a, hair-like precipitates, granular precipitates, cloudiness, or cloudiness did not occur, and a tendency to precipitate at low temperatures was not observed, when the refrigerating machine oil/refrigerant ratio (mass ratio) was in the range of 1/99 to 99/1 and even when the mixed fluid was cooled to −40° C.

The invention claimed is:

1. A refrigerating machine oil, comprising:
a low-viscosity hydrocarbon oil having a kinematic viscosity at 40° C. of 6 mm²/s or lower; and
a high-viscosity hydrocarbon oil having a kinematic viscosity at 40° C. of higher than 400 mm²/s;
wherein the high-viscosity hydrocarbon oil is a residual oil hydrocarbon base material selected from the group consisting of
an atmospheric distillation residual oil of a crude oil,
a vacuum distillation residual oil of the atmospheric distillation residual oil,
a deasphalted oil of the atmospheric distillation residual oil or the vacuum distillation residual oil,
a solvent extracted extract oil of the deasphalted oil,
a solvent extracted raffinate oil of the deasphalted oil, and
a refined oil of the atmospheric distillation residual oil, the vacuum distillation residual oil, the deasphalted oil, the solvent extracted extract oil or the solvent extracted raffinate oil,
wherein the refrigerating machine oil has a flash point of 130° C. or lower and a carbon residue of 10% residual oil of 0.02% by mass or more, wherein the carbon residue of 10% residual oil is measured by the Micro method in accordance with JIS K2270-2:2009 for residual oil obtained by distilling the refrigerating machine oil and removing distillate oil having a volume fraction of up to 90%, and wherein the refrigerating machine oil is used with a refrigerant.

2. The refrigerating machine oil according to claim 1, wherein a content of the low-viscosity hydrocarbon oil is 85% by mass or more based on the total amount of the refrigerating machine oil.

3. The refrigerating machine oil according to claim 1, wherein a content of the high-viscosity hydrocarbon oil is 10% by mass or less based on the total amount of the refrigerating machine oil.

4. The refrigerating machine oil according to claim 1, wherein the refrigerating machine oil has a 90% distillation temperature of 270° C. or lower.

5. The refrigerating machine oil according to claim 1, wherein the refrigerant comprises a hydrocarbon.

6. The refrigerating machine oil according to claim 1, wherein the high-viscosity hydrocarbon oil has a flash point of 250° C. or higher.

7. The refrigerating machine oil according to claim 1, wherein the high-viscosity hydrocarbon oil has a flash point of 300° C. or higher.

8. The refrigerating machine oil according to claim 1, wherein the high-viscosity hydrocarbon oil has a carbon residue of 0.1% by mass or more, wherein the carbon residue is measured by the Micro method in accordance with JIS K2270-2:2009.

9. A working fluid composition for a refrigerating machine oil comprising:
 the refrigerating machine oil according to claim 1; and
 a refrigerant.

10. The working fluid composition for a refrigerating machine oil of claim 9, wherein the refrigerant comprises a hydrocarbon.

* * * * *